3,458,249
LIGHT REJECTION BAND FILTER
Nicholas George, Pasadena, Calif., assignor to California Institute Research Foundation, Pasadena, Calif., a corporation of California
Filed Mar. 16, 1964, Ser. No. 352,181
Int. Cl. G02f *1/36*
U.S. Cl. 350—160                                   5 Claims

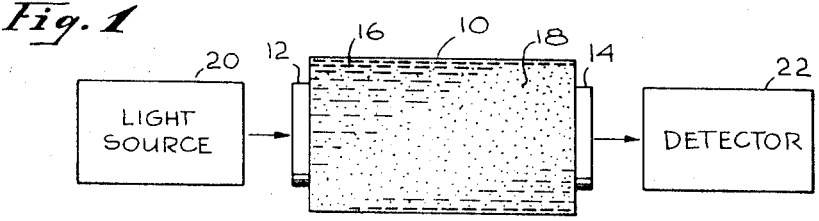
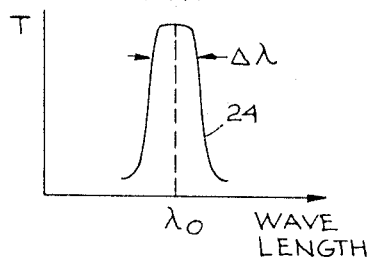
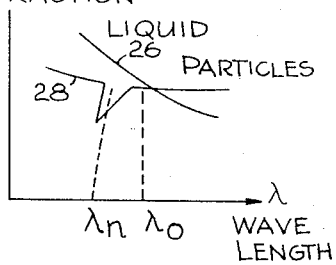
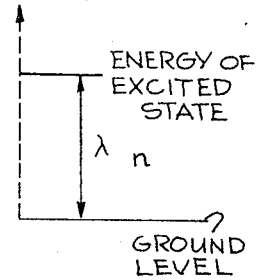
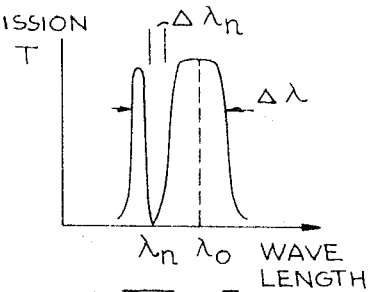
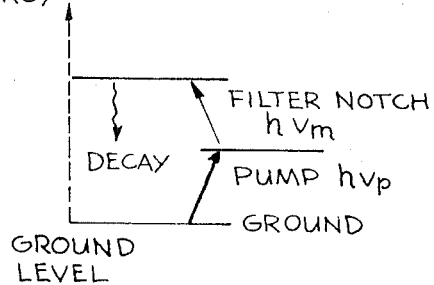
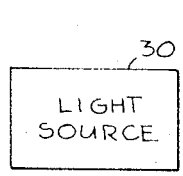
INVENTOR.
NICHOLAS GEORGE
BY Samuel Lindenberg
ATTORNEY

ABSTRACT OF THE DISCLOSURE

An optical filter which has a notched region within its pass band of light is constructed by providing a liquid having particles dispersed therethrough. The index of refrcation of the liquid and the particles is substantially the same. The particles also have a fine line absorbtivity for light in the vicinity of the region over which the indices of refraction of the particles in the liquid or vehicle in which they are dispersed are substantially the same.

---

This invention relates to optical filters and more particularly to an improvement in optical filters of the type known as Christiansen filters.

A Christiansen filter may be generally described as an optical or light filter which consists of a powder of some crystalline or glassy substance suspended in a transparent vehicle. The mixture will pass light with a minimum of attenuation which light has a wavelength at which the refractive indices of the powder and the vehicle are equal. Light at other wavelengths will be dispersed or reflected away from the central axis thereby attenuating the main transmitted beam. An article which describes the Christiansen light filter effect and also which sets forth a number of other reference papers directed thereto, is found described in "Physical Review" in an article entitled "The Christiansen Filter Effect in the Infrared" published May 15, 1936, page 732, by Barnes and Bonner.

It has been found that in situations where light is transmitted in systems, such as a laser radar tracking system, and it is desired to filter out the carrier and to amplify the Doppler shifted light return from a target at which the laser beam was directed, it would be most useful if a "notch" could be placed in the pass band of a Christiansen filter. The notch or "no-pass" region within the pass band would serve to filter out the carrier frequency leaving the Doppler shifted information to pass through the filter, whereby detection of the target velocity may be accomplished.

Accordingly an object of the persent invention is to provide an optical filter of the Christiansen type having a predetermined high absorbtion region within the pass band of the filter.

Yet another object of the present invention is the provision of a new and useful arrangement for an optical filter.

These and other objects of the present invention may be achieved by mixing a powder in a proper vehicle in the manner used in a Christiansen filter. The powder is selected to have a sharp or fine line absorptivity at a predetermined frequency. Good transmission through the filter occurs for light having a frequency such that the indices of refraction of the vehicle and the powder match, and transmission of light is considerably attenuated outside of the pass band of wavelengths. In addition the fine line absorptivity of the power causes a notch or high absorbtion region of certain wavelengths within the pass band of wave lengths, which is determined by the absorptivity region of the powder.

The novel features that are considered characteristic of this invention are set forth with particularity in the appended claims. The invention itself both as to its organization and method of operation, as well as additional objects and advantages thereof, will best be understood from the following description when read in connection with the accompanying drawings in which:

FIGURE 1 shows a typical Christiansen filter.

FIGURE 2 is a graph showing the filter transmission characteristics of a typical Christiansen filter.

FIGURE 3 is a curve showing the desired variations of the indices of refraction vs wave length of an embodiment of this invention.

FIGURE 4 is an energy diagram for particles used in a Christiansen filter in accordance with this invention.

FIGURE 5 is a graph showing transmission characteristics of an optical filter constructed in the course of this invention.

FIGURE 6 is a diagram of the energy states of a three energy level material which may be employed in an optical filter in accordance with this invention.

FIGURE 7 shows an arrangement of an optical filter in accordance with this invention.

Referring now to FIGURE 1 this illustrates the general appearance of an optical filter of the Christiansen type over which this invention is an improvement. The optical filter usually comprises a container 10 having an input and output light transparent window respectively 12, 14. The container is filled with a fluid 16 through which are dispersed powder particles 18. Light from a source 20 is cause to shine through an input window 12 and the light thereafter passes through the filter and out through the output window 14 into a detector 22.

The transmission characteristic of the presently known type of optical filter is shown in FIGURE 2. The curve 24 represents the transmission characteristic of the filter. Light, over a pass bandwith of $\Delta\lambda$ which is centered about a frequency $\lambda_0$, can pass through the filter and will be detected by the detector 22. Light outside of the pass bandwidth is multiply scattered or dispersed and will not pass through or be detected. The bandwidth is determined by the range of light frequency over which the indices of refraction of the liquid and the powder or particles dispersed therein, are substantially identical.

In accordance with this invention, the notch filter may be made by using powder particles which have a region of fine line absorptivity for light in the vicinity of the region over which the indices of a refraction of these particles and the liquid or vehicle in which they are dispersed are substantially the same. This is shown in FIGURE 3, wherein the curve 26 represents the variation of index of refraction with wavelength for a liquid, and the curve 28 represents the variation of index of refraction with light wavelength for particles dispersed in the liquid. At a frequency centered about $\lambda_n$, the powder particles absorb light energy thereby effectively notching the pass band region. As shown in the energy diagram of FIGURE 4, the particles having this characteristic absorb energy and some constituent atoms are thus brought to a higher energy level from the ground level.

The curve 25 in FIGURE 5 shows the filter transmission characteristic when particles having this absorptive characteristic are dispersed through the vehicle. The pass band comprising $\Delta\lambda$ has a notch region therein at a frequency $\lambda_n$ over which region of width $\Delta\lambda_n$ light having the wavelight $\lambda_n$ will be absorbed and will not be transmitted through the optical filter shown in FIGURE 1. As previously pointed out, where it is desired to remove the carrier from a phase-modulated carrier signal or Doppler modulated carrier signal, if $\lambda_n$ equals the frequency of the carrier, the detector 22 can detect the modulation without the carrier.

A notch filter, of the type described, which is useful with ruby laser radars wherein a ruby laser light source is employed, can be constructed of finely fragmented ruby particles, typically a 0.05% additive of chromium in aluminum oxide suspended in for example, a solution of benzol and bisulphide of carbon, or in some other liquid for which index matching is obtained. A sharp notch is obtained with this mixture at 6,943 angstroms.

A variation of the basic invention is shown in FIGURES 6 and 7. In FIGURE 6, the energy level structure of the particles which are used may be such that the population of an upper energy level is required in order to obtain absorption at the desired notch wavelength, $\lambda_n$. With particles having such a characteristic, it is necessary to pump these particles up to the lower energy level from the ground level wherein they may absorb energy from the light source, being brought to a higher energy level, from whence they thereafter decay. An illustration of particles having this characteristic which are suitable in an optical filter in accordance with this invention may be particles of trivalent neodymium in calcium tungstate.

An arrangement for an optical filter in which pumping is used to obtain the desired notch pass band is shown in FIGURE 7. A light source 30 emits light to an optical filter 32 which is constructed identically with the one 10 shown in FIGURE 1. A detector 34 detects the light which passes therethrough. An electrical power source 36 applies energy to a gas-filled lamp 38 which, when illuminated, performs the pumping function bringing the particles from the ground energy level up to the energy level at which they can absorb light over the notch bandwidth $\Delta\lambda_n$.

The bandwidth $\Delta\lambda$ may be controlled by controlling the size of the particles which are dispersed in the liquid and the length of the cell containing these. The notch bandwidth may be controlled by the energy level structure of the impurity-particle combination. This can, in practice, be varied considerably, e.g., by varying percentage of doping or by operation at different temperatures.

Accordingly, there has been described herein a novel, useful, and improved optical filter having the transmission characteristic of a sharp rejection band which may be selectively placed within a light pass band. While the foregoing description recites that the optical filter comprises a vehicle through which there is dispersed properly doped particles, by the term "vehicle," there is meant not only a liquid but also a gas such as air in which the powder may be dispersed as a cloud. Or, alternatively, a colloidal suspension in which the particle is actually a fluid or liquid and the vehicle is a liquid too.

What is claimed is:

1. An improved optical filter comprising a vehicle, powder particles dispersed throughout said vehicle, said particles being selected to have the property that they will absorb light energy over a predetermined region of light wavelengths, said vehicle being selected to have the property that its index of refraction is substantially equal to the index of refraction of said powder particles over a band of light wavelengths which includes the region of light absorption.

2. An improved optical filter as recited in claim 1 wherein said particles are a 0.05% additive of chromium in aluminum oxide, and said vehicle is a solution of benzol and bisulphide of carbon.

3. An optical filter comprising a vehicle, particles dispersed through said vehicle, said particles being selected to have the property that when they are brought to a predetermined energy level, they will absorb energy from light having a predetermined frequency, said vehicle having the property that its index of refraction is substantially equal to the index of refraction of said particles over a bandwidth of light frequencies which includes the frequency at which said particles absorb energy from light, and means for pumping said particles with energy to bring them to the energy level at which they will absorb said predetermined light energy.

4. An optical filter as recited in claim 3 wherein said particles are an additive of trivalent neodymium in calcium tungstate.

5. An optical filter as recited in claim 3 wherein said means for pumping comprises light means which provides light energy at a predetermined frequency for bringing the energy of the particles to the level at which they will absorb said light.

References Cited

UNITED STATES PATENTS

| | | | |
|---|---|---|---|
| 3,354,404 | 11/1967 | Boyle et al. | 331—94.5 |
| 3,126,485 | 3/1964 | Ashkin et al. | 331—94.5 |
| 3,225,306 | 12/1965 | Johnson et al. | 331—94.5 |
| 3,281,713 | 10/1966 | Soules | 331—94.5 |

OTHER REFERENCES

Barnes and Barnes: "The Christiansen Filter Effect in the Infrared," Physical Review, vol. 49, May 15, 1936, 350/312.

McAlister, E. D.: "The Christiansen Filter—Its Advantages and Limitations," Smithsonian Miscellaneous Collections, vol. 93, No. 7 (Apr. 2, 1935) 350/312, pp. 1–14.

Redfield, D. and Baum, R. L.: "Infrared Christiansen Filter Effect With Boron Nitrate," JOSH, vol. 51, No. 2, February 1961, OC 35006 gr. 350 pages 184–185.

DAVID SCHONBERG, Primary Examiner

T. H. KUSMER, Assistant Examiner

U.S. Cl. X.R.
331—94.5; 350—312